Nov. 24, 1931.  H. H. BURHANS  1,833,315
FILTERING MEDIUM
Filed Dec. 21, 1923
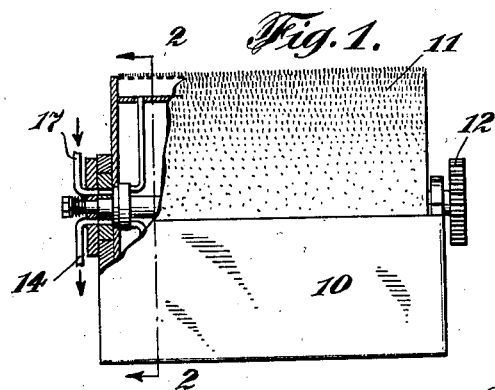
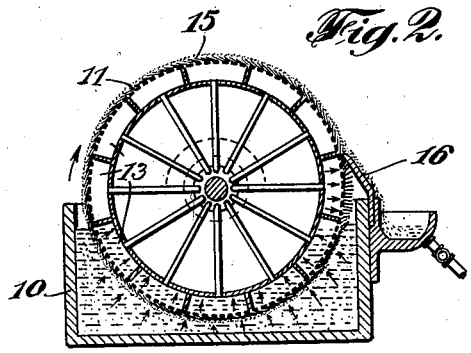
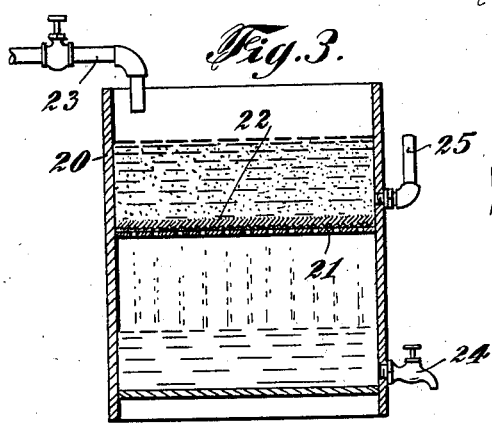
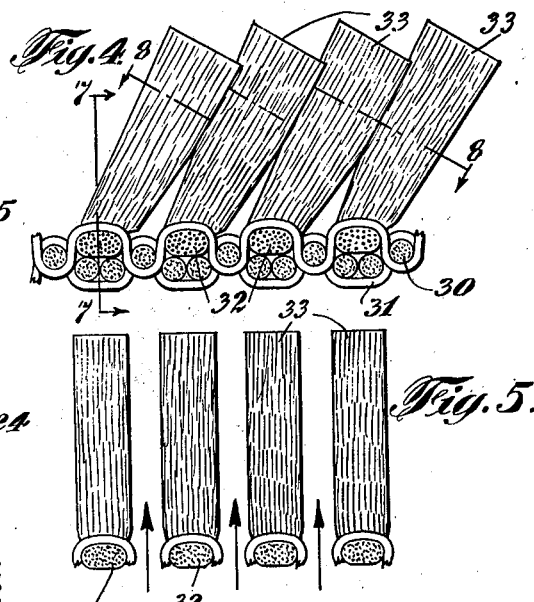
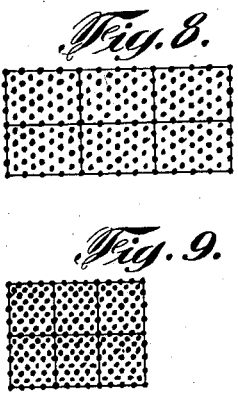
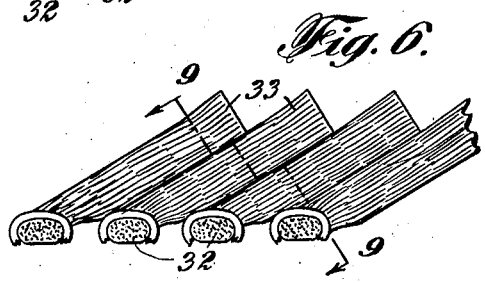
INVENTOR
Harry H. Burhans
BY
Dean, Fairbank, Abright & Hirsch
his ATTORNEYS Patented Nov. 24, 1931

1,833,315

UNITED STATES PATENT OFFICE

HARRY H. BURHANS, OF NEW YORK, N. Y.

FILTERING MEDIUM

Application filed December 21, 1923. Serial No. 681,915.

My invention involves a new filtering medium for the romoval of suspended matter from fluids.

One of the main objects is to permit of a control in a very simple manner of the size of the separatory channels or passages, and therefore the size of the particles passing through to the filtrate during the filtering operation.

Further objects are to provide a filtering medium which may be easily and quickly cleaned by a reverse flow of fluid therethrough, and which may have the cake removed by a scraper without injury or appreciable wear or alteration of the size or character of the separatory passages.

My improved filtering medium is inexpensive, durable and easy to insert or attach in the filtering apparatus, and includes a base structure or body portion preferably in the form of a woven fabric of sufficiently loose weave to permit the passage of the maximum size of particles which the operator may care to have go through to the filtrate. The base structure carries the main filtering structure which is in the form of a multiplicity of members secured to the base structure and extending substantially parallel to each other and at an angle to the base. The angle may be varied and this will cause a variation in the size of the filtering passages between said members. With the members at right angles to the base the passages will be of maximum size. As the angle becomes smaller the members will lie closer together and with the members pressed as near as possible to parallelism with the base the passages will be of the minimum size determined by the shape and size of said members.

As one important feature the parallel members are so formed and so connected to the base or body portion that the angle at which they lie may be varied by merely varying the pressure difference upon opposite sides of the filtering medium. The greater this difference the closer will the members press down against the body, and the smaller will be the separatory passages between the members, and the smaller will be the particles which can be filtered or separated from the fluid medium or carrier. The operator may merely vary the pressure difference to get fine or coarse filtration, as desired.

In its preferred form the filtering medium may be constructed similar to a long pile or long nap fabric with the nap or pile constituting the multiplicity of members carried by the warp and woof of the body structure of the fabric. Such pile or nap normally extends at an angle to the plane of the base fabric, and this angle will vary by variation of the fluid pressure difference upon opposite sides of the medium. For filtering some kinds of fluids the warp, woof and pile may all be formed of threads or fibres of animal or vegetable matter, such as wool, cotton, or the like. For filtering mediums which might injuriously affect such vegetable or animal matter the woven base structure, that is, the warp and woof, may be formed of wire, and the pile or nap may also be of wire. In some cases the base structure may be of wire to give strength and durability, and the nap or pile which is woven into the base structure and carried thereby may be of animal or vegetable fibre. The fibre, wires or other members may be selected of the proper material and of the proper diameter dependent upon the character of the material to be filtered and the minimum diameter of separatory passages which it is desired to form when the pile or nap is pressed down against the base structure.

I am aware that long napped blankets, cotton flannel and the like have occasionally been used heretofore as filtering mediums, but such fabrics involve merely a warp and a woof, and the nap is very thin and is composed of delicate fibres which form a part of the warp and woof threads. Such napped fibres do not retain the parallel positions, they form irregularly shaped and spaced passages, and act to close up the passages of the base weave. The effect is merely that of a screen upon which has been superimposed a thin mat of irregularly spaced delicate fibres. The separation is effected merely through the entanglement of the solids in the irregular openings in the mat of fibres. Owing to the irregularity of the openings a considerable quantity of the finer solids is drawn through the larger openings in the mat and passes through to contaminate the filtrate. The capacity of such filtering mediums drops off very rapidly and finally requires removal and brushing or bending back and forth to remove the solids which have become firmly entangled in the openings in the base and entangled with the fibres composing the irregular mat on the base. Variation of filtering pressure does not materially affect the capacity of this class of filtering medium other than to more firmly embed or entangle solid particles in the mass and thus cause the filtering medium to be more rapidly clogged up and rendered inoperative. This is particularly true when filtering jelly-like or colloidal mixtures.

With my improved construction the definite pile composed of approximately parallel strands of yarn, fibre or wires set fairly closely together in a nearly vertical position and supported and held in position by the warp and woof of the open base weave, forms parallel separatory passages between the fibres and these may be varied in size at will, and may be easily and quickly cleaned by a reverse flow of fluid through the medium which tends to straighten up the nap or pile and increase the size of the separatory passages and quickly and completely clear the same.

My improved filtering medium may be used in any type of filter, and for the filtration of any form of suspended matter, irrespective of whether it be gelatinous, fibrous, granular or crystalline.

In the accompanying drawings:

Fig. 1 is a side elevation partly in section, of one type of filtering apparatus in connection with which my improved medium may be employed, a portion of the apparatus being shown in section.

Fig. 2 is a transverse section on the line 2—2 of Fig. 1.

Fig. 3 is a section through a different type of filtering apparatus.

Fig. 4 is a section through the filtering medium on a very greatly enlarged scale, and showing the parts in a somewhat idealized normal position.

Fig. 5 is a section of the upper portion of the fabric similar to Fig. 4, but showing the parts in the position they take during reverse flow of fluid and cleaning of the passages.

Fig. 6 is a view similar to Fig. 4, but showing the position which the pile takes under high pressure.

Fig. 7 is a section at right angles to the plane of Fig. 4, as for instance on the line 7—7 of Fig. 4.

Figs. 8 and 9 are sections on the lines 8—8 and 9—9 respectively of Figs. 4 and 6, showing diagrammatically the variation in the spacing of the fibres under variation in pressure.

In Figs. 1 and 2 I have shown somewhat conventionally a common type of filter in which there is a receptacle 10 for the liquid to be filtered and a drum 11 mounted to rotate with the lower portion within the liquid of the receptacle 10. Any suitable means is provided for continuously rotating the drum, as for instance a gear 12, so that there is a continuous movement of the periphery of the drum through the liquid. The interior of the drum is divided into compartments 13 and one hub is provided with a suction pipe 14 which is brought into open communication with each compartment as the latter passes into the liquid. The periphery of the drum is formed of or carries the sheet 15 of the filtering medium. As the drum rotates and each successive section comes into the liquid, a partial vacuum is formed within the compartment, and the liquid is sucked through the filtering medium into the drum, and thence out through the pipe 14. A cake forms on the periphery of the drum and is carried up above the liquid level, and is removed from the periphery by a scraper 16. If desired the hub may also be provided with a pipe connection 17 for a cleaning fluid. This may be compressed air, and may communicate with each compartment, preferably after it passes the scraper 16. The mechanical features of this filtering apparatus form no portion of my invention and may be varied at will.

In Fig. 3 I have shown somewhat diagrammatically another form of apparatus in which there is a chamber 20 provided with a transverse partition 21 supporting the filtering medium 22. Liquid is admitted to the upper compartment through an inlet pipe 23, and the filtrate may be drawn off from the lower compartment through a valve controlled outlet 24. The level of the liquid in the upper compartment may be maintained at any desired elevation by any suitable mechanism appropriate for the purpose. One simple means is an overflow pipe 25 pivotally mounted by an elbow so that the upper end may be swung to the desired elevation. With such an arrangement liquid would be supplied through the pipe 23 faster than it could pass through the filter and the excess would overflow from the pipe 25 which latter would maintain a constant level within the filter. By varying the liquid level and therefore the weight of liquid on the filtering medium, the pressure on said medium may be varied at will to get coarse or fine filtration. In the construction shown in Figs. 1 and 2 the vacuum may be increased or decreased to create the desired pressure difference upon opposite sides of the filtering medium and thus get coarse or fine filtration.

In Figs. 4 to 9 inclusive I have shown on a very greatly enlarged scale and very much idealized, a pile fabric suitable for use as a filtering medium, in accordance with my invention. The fabric there shown includes a base structure formed of warp threads 30 and woof threads 31, certain of the woof threads acting to bind in the loops 32 of the pile or nap 33. Each loop may be formed of a multiplicity of very fine fibres of animal, vegetable or metallic material, and they are so woven as to normally stand at an angle to the plane of the base fabric, as for instance that shown in Fig. 4. The minute fibres spread out and separate so as to form a multiplicity of small separatory passages between the fibres of each loop. On the surface the loops spread apart so as to present a substantially uniform surface. The passages will run substantially parallel to the general direction of the length of the fibres, and therefore as the fibres are pressed down toward the base and maintain substantially their parallel position, the fibres will come closer together and the passages will be reduced in size. I have found from experiment that by merely varying the pressure difference upon opposite sides of the fabric the fibres may be caused to vary in angle. The greater the pressure the flatter will the fibres lie, and therefore the smaller will be the separatory passages. As previously indicated I do not wish to be limited to any particular means for varying these pressure differences. It may be by variation in the depth of the body of liquid to be filtered as in Fig. 3, or a variation of the vacuum on the filtrate side, as in Fig. 2, or a combination of these, or by other means. The fibres may be substantially round in cross section, such as those of vegetable or animal matter, or wires, or they may be flattened sheets or plates, or any other character of element capable of swinging in respect to the base structure and maintaining substantial parallelism with variation in the size of the passages therebetween. They may be thin and flat like boards or shingles to form passages which are comparatively thin but wide. The fibres themselves are substantially noncompressible, but the loops or tufts of the fibres are compressible to bring the fibres closer together, and the nap itself is of course compressible. The passages remain of substantially uniform size with the fibres in any position. This gives accurate determination of the filtering action and uniform and complete cleansing action. The reverse flow in cleaning is through all of the passages and automatically acts to open them up. No brushing or scraping is necessary to clean. Little or none of the solids reach the base structure during filtering action, as most of the solids are caught at the outer ends of the passages between the fibres. Thus the base structure does not get clogged up, and this in itself facilitates rapid cleaning. The pile is of a very appreciable thickness and particularly in respect to the thickness of the warp and woof. A pile of at least one-eighth of an inch is desirable.

In cleansing I may employ a scraper as shown in Fig. 2. The relative movement of the scraper and the filtering medium is in such direction that the scraper presses or smooths down the pile and squeezes the solid matter out of the passages toward the open end thereof. In some constructions a scraper need not be employed as the material may be entirely removed by the reverse flow of a cleaning liquid. With the scraper the reverse flow may occur only through the portion below the scraper and the part thus removed may return to the original receptacle of liquid to be filtered, or may be conducted to a separate container. The filtering medium may be employed for filtering gases or emulsions, as well as for removing solid matter from liquids.

Having thus described my invention, what I claim as new and desire to secure by Letters Patent is:—

1. A separatory fabric having a base structure including a warp and a woof, and a separatory structure comprising pile members disposed at an angle to the plane of the base structure, and of such length as to overlap and form a filter medium of considerable thickness, the voids between adjacent members of the pile constituting the separatory passages, and said members being movable in respect to the base structure to vary the cross-sectional area of said passages.

2. A separatory fabric having a base structure and a separatory structure carried thereby, and comprising substantially parallel pile members longer than one-eighth of an inch and closely spaced to form separatory channels therebetween and movable in parallelism to vary the size of said channels.

3. A separatory fabric having a woven base structure and a pile of approximately parallel members disposed at an angle to the plane of the base structure and of such length as to overlap and form separatory channels lengthwise of said members, said members being movable in respect to the base structure to vary the cross-sectional area of the separatory channels through the pile, said members each having one end attached to said base structure and the other end free.

4. A separatory fabric having a woven base structure and a pile of approximately parallel members disposed at an acute angle to the plane of the base structure and movable in respect to the latter while remaining in parallelism, the angle of said members to said base structure being variable under varying degrees of pressure.

5. A separatory medium having a base sheet and a plurality of relatively movable flexible members of comparatively small cross-sectional area secured thereto and disposed on one side thereof in substantially parallel overlapping relationship at an angle to the plane of said base sheet, the secured ends of said members being closely spaced, and the length of said members in respect to the spacing of the secured ends being such that each member overlaps another along a major portion of the length thereof, whereby the separatory passages are formed lengthwise of said members and along a major portion of the length of each, said members being movable in parallelism in respect to said plane to vary the size of said passages in accordance with variations in the pressure of a fluid applied to the first mentioned side of said base sheet.

6. A filtering medium including a base sheet and a plurality of elongated substantially parallel elements on one side thereof, each having one end secured to said base sheet and the other end free, said members being positioned closely adjacent to each other normally disposed at an angle to said base sheet and overlapping to form separatory passages between said members extending along the major portion of the length of the latter, whereby upon delivery of a fluid to be filtered to said side of said base sheet, the size of the separatory passages will vary in accordance with the pressure of said fluid.

7. A filter for separating solids from a suspending medium including a body sheet, and a multiplicity of relatively movable members secured thereto in overlapping parallel arrangement throughout substantially their entire length, said members having normal positions at an acute angle to the plane of said body sheet, irrespective of the position of said sheet, and having such resiliency that they will move to positions substantially at right angles to the plane of said body sheet upon reverse flow of fluid through the filter during cleaning operation.

8. A filter having a base sheet, and a plurality of relatively movable filamentary members secured thereto and disposed on one side thereof in substantially parallel overlapping relationship and normally at an angle to the plane of said base sheet to form separatory passages lengthwise of said members, the length of said members in respect to the spacing of the secured ends being such that each member overlaps another along a major portion of the length thereof, the outer ends of said members being free to move in accordance with the force and direction of flow of a fluid through said sheet, and to thereby vary the size of the separatory passages.

Signed at New York, in the county of New York and State of New York, this 8th day of December A. D. 1923.

HARRY H. BURHANS.